United States Patent [19]
Simon

[11] 3,978,823
[45] Sept. 7, 1976

[54] LPG BURNING INTERNAL COMBUSTION ENGINE, ESPECIALLY OTTO ENGINE

[75] Inventor: Michael Simon, Munich-Obermenzing, Germany

[73] Assignee: Maschinenfabrik Augsburg-Nurnberg AG, Germany

[22] Filed: Aug. 27, 1973

[21] Appl. No.: 391,773

[30] Foreign Application Priority Data
Aug. 26, 1972  Germany............................ 2242049

[52] U.S. Cl. .................................. 123/1 A; 261/16; 123/122 E
[51] Int. Cl.² ......................................... F02B 75/00
[58] Field of Search........ 123/1 A, DIG. 12, 27 GA, 123/3, 127, 119 E, 122 E, 122 R; 261/16, 18

[56] References Cited
UNITED STATES PATENTS

| | | | |
|---|---|---|---|
| 2,602,289 | 7/1952 | Anxionnaz et al. ......... | 123/DIG. 12 |
| 2,636,814 | 4/1953 | Armstrong et al. ............... | 261/16 X |
| 2,767,691 | 10/1956 | Mengelkamp et al. ............. | 123/1 A |
| 2,965,085 | 12/1960 | Kahler ................. | 123/1 A |
| 3,014,705 | 12/1961 | Colucci................. | 261/16 |
| 3,471,274 | 10/1969 | Quigley, Jr. et al. ......... | 123/119 E X |
| 3,524,734 | 8/1970 | Kamiryo et al.............. | 123/122 E X |
| 3,565,201 | 2/1971 | Petsinger .......................... | 261/16 X |
| 3,672,341 | 6/1972 | Smith et al........................ | 261/16 X |
| 3,771,260 | 11/1973 | Arenson............................ | 261/16 X |

FOREIGN PATENTS OR APPLICATIONS
1,158,934  7/1969  United Kingdom................... 261/16

*Primary Examiner*—Charles J. Myhre
*Assistant Examiner*—William C. Anderson
*Attorney, Agent, or Firm*—Craig & Antonelli

[57] ABSTRACT

An internal combustion engine, especially Otto engine, which utilizes fuel gas supplied in a low-temperature liquefied state for the combustion process. Heat exchange means are provided for effecting a heat exchange between the intake combustion air and the fuel gas such that the combustion air is cooled down prior to combustion by its use as a heat-emitting heat-exchanging medium for preheating the low-temperature liquefied fuel gas. In one preferred embodiment, the heat exchange means is a mixing carburetor arranged upstream of the engine combustion chamber and in another preferred embodiment of the invention, the heat exchanger means is a non-contact heat exchanger for effecting heat transfer without mixing of the combustion air and fuel gas.

16 Claims, 2 Drawing Figures

LPG BURNING INTERNAL COMBUSTION ENGINE, ESPECIALLY OTTO ENGINE

BACKGROUND AND SUMMARY OF THE INVENTION

This invention relates to an internal-combustion engine and, more particularly, this invention relates to an Otto engine using fuel gas in a low-temperature liquefied state as a fuel. Said liquid may be at a temperature of, e.g., −100°C.

The absolute power output and the specific fuel consumption of Otto engines are largely dependent upon the intake temperature of the combustion air. At as small a temperature difference as 50°C the difference in output may already be about 50% and in efficiency about 5%. The power output can be augmented by achieving greater volumetric efficiencies or smaller specific air volumes with correspondingly lower specific compression efficiencies by cooling or precooling the combustion air (intake air) prior to combustion.

It has been contemplated to provide means for heating the low-temperature liquefied (cryogenic) or cold liquefied gas prior to combustion by using exhaust heat from the engine. However this just-mentioned arrangement is disadvantageous when compared with the present invention.

The present invention contemplates providing apparatus and a method for recovering energy spent for low-temperature liquefaction of the fuel gas. It is particularly contemplated by this invention to provide an engine which achieves recovery of energy used for low-temperature liquefaction of the fuel gas by cooling the combustion air prior to combustion by its use as a heat-emitting heat-exchanging medium for preheating and/or pre-evaporating the low-temperature liquefied fuel gas.

This just-mentioned precooling process permits especially ecomonical recovery to be achieved of the liquefaction energy in the fuel gas, for with stoichiometric combustion (excess air factor $\lambda=1$) the combustion air or intake air can be cooled by about 43°C, the power output will be enhaced by about 45% and the efficiency will be improved to about 6% when use is made of methane ($CH_4$) as a fuel gas. The specific power output and efficiency improvement will depend on the total initial temperature different of the intake air and the gas.

The corresponding figures of intake air cooling, power output, and efficiency for hydrogen would be 74°C, 80% and about 10% respectively. The engine of this invention accordingly provides notable improvements in output and efficiency. The inventive process may also be termed cryogenic supercharging of an internal-combustion or Otto engine.

The cooling of the combustion air by preheating and/or pre-evaporating the liquid according to preferred embodiments of the invention can be achieved by indirect heat transfer in a suitable heat exchanger or by direct heat transfer resulting from the mixing of the combustion air with the liquid. For carburetor engines, the direct heat transfer embodiment is preferred.

DETAILED DESCRIPTION OF THE DRAWINGS

Figure 1:
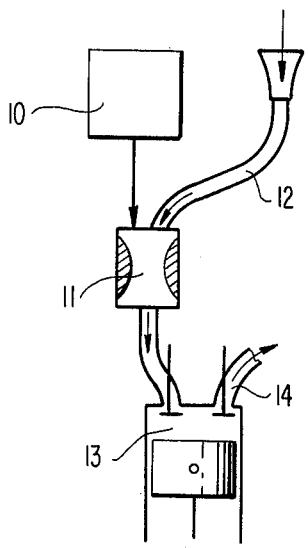
FIGS. 1 and 2 schematically illustrate two embodiments of an engine arranged and operated in accordance with this invention.

With reference to FIG. 1, low-temperature liquefied fuel gas for a carburetor engine is stored in a tank 10 at a temperature of approximately −100°C. This liquid fuel gas is fed to a carburetor 11 which also receives the intake air for said engine through a line 12. The intake air is at a temperature of approximately 20°C. Both media are directly mixed in the carburetor 11, where the liquid fuel gas is directly heated and at least partially evaporated by the intake air which cools down in the process. The mixture issuing from the carburetor 11 then flows into the cylinder chamber 13 of the carburetor engine where it burns up. The exhaust gases escape from the cylinder chamber 13 through an exhaust pipe 14.

Figure 2:
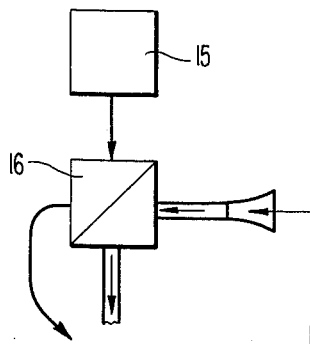

With reference now to FIG. 2, low-temperature liquefied fuel gas from a tank 15 and the intake air (depicted by left facing arrows) flow through a heat exchanger 16 where said liquid fuel gas is indirectly heated by the intake air and the intake air is cooled in the process. The heated liquid represents the fuel and the cooled intake air the combustion air which are introduced into the combustion chamber (not shown) of an Otto engine at a position or positions downstream of the heat exchanger 16.

The arrowheads indicate the directions of flow of the respective flow media. In FIG. 2, separate flow paths for the fuel gas and the combustion air are provided between the heat exchanger and combustion chamber.

The details of the carburetor 11, the heat exchanger 16 and the Otto engine are not included herein in order not to obscure the present invention. It will be understood that one skilled in the art, given the present disclosure, could readily practice the present invention.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. An internal combustion engine arrangement comprising:
    fuel supply means for supplying the fuel gas in a low-temperature liquefied state,
    combustion air supply means for supplying combustion air at a temperature higher than said fuel gas in said fuel supply means,
    heat exchange means for effecting heat exchanger between said combustion air and said fuel gas,
    and conducting means for conducting said combustion air and fuel gas from said heat exchange means to an engine combustion chamber,
    whereby said combustion air is cooled down prior to combustion by its use as a heat-emitting heat-exchanging medium for preheating the low-temperature liquefied fuel gas, and
    wherein said heat exchange means is constructed as a carburetor which directly mixes said combustion air and liquefied fuel gas at a position upstream of said combustion chamber.

2. An arrangement according to claim 1, wherein said fuel supply means includes a storage tank for storing said liquefied fuel gas at a temperature of approximately −100°C, and wherein said combustion air supply means includes means for supplying air to said heat exchange means at a temperature of approximately 20°C.

3. An arrangement according to claim 2, wherein said heat exchange means is constructed as a carburetor which directly mixes said combustion air and liquefied fuel gas at a position upstream of said combustion chamber, said fuel supply means further including a fuel line connecting said storage tank to said carburetor so as to supply said liquefied fuel gas to said carburetor at approximately −100°C.

4. An arrangement according to claim 1, wherein said liquefied fuel gas is methane.

5. An arrangement according to claim 1, wherein said liquefied fuel gas is hydrogen.

6. An arrangement according to claim 1, wherein combustion in said combustion chamber is in accordance with Otto engine operation.

7. A method according to claim 6, wherein said liquefied fuel gas is methane.

8. A method according to claim 6, wherein said liquefied fuel gas is hydrogen.

9. An arrangement according to claim 1, wherein said liquefied fuel gas is maintained in said supply means at temperatures far below the ambient temperature.

10. An arrangement according to claim 1, wherein said liquefied fuel gas is of the type which will vaporize at a temperature far below the ambient temperature at atmospheric pressure, and wherein said combustion air is ambient air.

11. A method of operating an internal combustion engine comprising:

supplying fuel gas in a low-temperature liquefied state, supplying combustion air at a temperature higher than said fuel gas, effecting a heat exchange between said combustion air and said fuel gas to thereby cool said combustion air and heat said fuel gas, and conducting said fuel gas and combustion air after said heat exchange to a combustion chamber of said engine for combustion therein, wherein said step of effecting said heat exchange includes passing both said combustion air and liquefied fuel gas through a mixing carburetor arranged upstream of said engine to thereby mix said combustion air and liquefied fuel gas together preliminary to their conductance to said combustion chamber.

12. A method according to claim 11, wherein said fuel gas is supplied at a temperature of approximately −100°C and said combustion air is supplied at a temperature of approximately 20°C.

13. A method according to claim 11, wherein said liquefied fuel gas is supplied at a temperature of approximately −100°C and said combustion air is supplied at a temperature of approximately 20°C.

14. A method according to claim 11, wherein combustion in said combustion chamber is in accordance with Otto engine operation.

15. A method according to claim 11, wherein said liquefied fuel gas is maintained in said supply means at temperatures far below the ambient temperature.

16. A method according to claim 15, wherein said liquefied fuel gas is a cryogenic fluid, and wherein said combustion air is ambient air.

* * * * *